US007969885B2

(12) United States Patent
Laulainen (10) Patent No.: US 7,969,885 B2
(45) Date of Patent: Jun. 28, 2011

(54) ADJUSTING THE DEGREE OF FILLING OF A JITTER BUFFER

(75) Inventor: Mikko Laulainen, Helsinki (FI)

(73) Assignee: Tellabs Oy, Espoo (FI)

( * ) Notice: Subject to any disclaimer, the term of this patent is extended or adjusted under 35 U.S.C. 154(b) by 170 days.

(21) Appl. No.: 12/176,342

(22) Filed: Jul. 19, 2008

(65) Prior Publication Data

US 2009/0022051 A1 Jan. 22, 2009

(30) Foreign Application Priority Data

Jul. 20, 2007 (FI) .................................. 20070561

(51) Int. Cl.
*H04L 12/26* (2006.01)
(52) U.S. Cl. ........................................................ 370/235
(58) Field of Classification Search ........... 370/229–240
See application file for complete search history.

(56) References Cited

U.S. PATENT DOCUMENTS

| | | | |
|---|---|---|---|
| 5,526,362 A * | 6/1996 | Thompson et al. ........... 370/516 |
| 5,623,483 A | 4/1997 | Agrawal et al. | |
| 6,452,950 B1 | 9/2002 | Ohlsson et al. | |
| 6,687,770 B1 * | 2/2004 | Mahe et al. ..................... 710/53 |
| 6,862,298 B1 * | 3/2005 | Smith et al. ................... 370/516 |
| 7,170,901 B1 | 1/2007 | Katzur | |
| 7,359,324 B1 * | 4/2008 | Ouellette et al. .............. 370/230 |
| 7,581,019 B1 * | 8/2009 | Amir et al. ..................... 709/235 |
| 2001/0005371 A1 * | 6/2001 | Sera ............................... 370/394 |
| 2004/0022262 A1 * | 2/2004 | Vinnakota et al. ............. 370/429 |
| 2004/0093440 A1 * | 5/2004 | Lakaniemi et al. ............. 710/29 |
| 2004/0186877 A1 * | 9/2004 | Wang et al. .................... 709/200 |
| 2004/0240478 A1 * | 12/2004 | Goren et al. ................... 370/503 |
| 2005/0031097 A1 * | 2/2005 | Rabenko et al. ........... 379/93.31 |
| 2005/0041692 A1 * | 2/2005 | Kallstenius .................... 370/503 |
| 2005/0058146 A1 * | 3/2005 | Liu et al. ........................ 370/412 |
| 2005/0088975 A1 * | 4/2005 | Wildfeuer et al. ............. 370/235 |
| 2005/0157705 A1 * | 7/2005 | Galetto et al. ................. 370/352 |
| 2005/0232309 A1 * | 10/2005 | Kavaler ......................... 370/519 |
| 2007/0140398 A1 | 6/2007 | Inoue et al. | |
| 2007/0223467 A1 * | 9/2007 | Makiuchi et al. ............. 370/363 |
| 2007/0260870 A1 * | 11/2007 | Nissan et al. .................. 713/150 |
| 2008/0002669 A1 * | 1/2008 | O'Brien et al. ................ 370/352 |
| 2008/0151765 A1 * | 6/2008 | Cheruvathery ............... 370/252 |
| 2009/0296795 A1 * | 12/2009 | Lindqvist et al. ............. 375/224 |

FOREIGN PATENT DOCUMENTS

| EP | 1 724 960 | 9/2005 |
|---|---|---|
| WO | 03/007517 A1 | 1/2003 |

* cited by examiner

*Primary Examiner* — Kwang B Yao
*Assistant Examiner* — Kenan Cehic
(74) *Attorney, Agent, or Firm* — Young & Thompson (57) ABSTRACT

A method and arrangement for adjusting the degree of filling of a jitter buffer in a network element receiving digital data. To the jitter buffer, there is connected a read-out unit for reading digital data from the jitter buffer. In the method, there is composed a time reserve indicator for the received protocol unit, the time reserve indicator being essentially the difference of an order indicator connected to the protocol unit and an order indicator connected to the operational cycle of the read-out unit. The time reserve indicator of the protocol unit indicates whether the protocol unit was received in good time, in order to ensure that the digital data is in the jitter buffer when the digital data is in turn to be read out. The degree of filling of a jitter buffer is adjusted on the basis of time reserve indicators composed for the received protocol units.

34 Claims, 4 Drawing Sheets

ADJUSTING THE DEGREE OF FILLING OF A JITTER BUFFER

FIELD OF THE INVENTION

The invention relates to a method and arrangement for adjusting the degree of filling of a jitter buffer in a network element receiving digital data.

BACKGROUND

In a packet, frame or cell switched data transmission network, digital data is transmitted in data transmission packets, cells or frames. Below in this document, a data transmission packet, cell and frame are called protocol units. Protocol units used in a data transmission service can be either standard-sized or with an alternating size. A data transmission network typically causes random-type fluctuation in the transmission delay, because protocol units must queue in queue buffers of network elements provided in the data transmission route for durations determined by the momentary load situation. Said network elements can be for example IP routers (Internet Protocol), ATM switches (Asynchronous Transfer Mode), MPLS switches (MultiProtocol Label Switching) or Ethernet switches. The effect of the fluctuation in the transmission delay can be eliminated, or it can be alleviated by using a jitter buffer at the reception end, in which jitter buffer the digital data contained by the received protocol units is stored, and from which said digital data is read by using a clock signal where the fluctuation of the frequency is sufficiently slight, and the timewise average of the frequency of said clock signal corresponds to the average arrival rate of said digital data. Thus the jitter buffer absorbs the fluctuation of the transmission delay either completely or partly, so that the quantity of the digital data contained by the jitter buffer, i.e. the degree of filling of the jitter buffer, varies. The average degree of filling of the jitter buffer must be sufficiently high, in order to ensure that the density of occurrence of situations where the digital data read-out sequence begins already before said digital data has arrived in the jitter buffer. On the other hand, the average degree of filling of a jitter buffer should not be unnecessarily high, in order to avoid an excessively long digital data turn-around delay from being created in the jitter buffer. In connection with the manufacturing and/or implementation of a network element, the maximum and minimum values of the transmission delays experienced by protocol units to be received in the future are generally not known. In addition, the distribution of transmission delays caused by the data network can alter during the service time of a network element, for example due to rerouting arrangements. Consequently, a network element is often provided with adjusting devices, the task of which is to adjust the degree of filling of a jitter buffer within the scope of the above described boundary conditions.

The publication US2005/0058146 A1 introduces a solution where the degree of filling of a jitter buffer is increased as a response to a situation where in the jitter buffer there is not found a data packet, the digital data contained by which would be in turn to be read out. The process of increasing the degree of filling of a jitter buffer is carried out by feeding in the jitter buffer filler packets that can be for instance data packets containing digital data that has been read out at an earlier stage. The suggested solution is based on the fact that the data packet that is in turn to be read out is not found in the jitter buffer, when the transmission delay experienced by said data packet is longer than can be compensated by the degree of filling of the jitter buffer. Now the missing of said data packet indicates a need to increase the degree of filling of the jitter buffer. Likewise, when a data packet to be transmitted has been dropped, for example because of a protocol error or a traffic jam in a network element located in the data transmission route, there arises a situation where in the jitter buffer, there is not found the data packet, the digital data contained by which would be in turn to be read out. Thus also the dropping of a data packet dropping results in increasing the degree of filling of the jitter buffer.

A dropped data packet never reaches its destination, and therefore the transmission delay experienced by it is theoretically infinite. However, the dropping of a data packet does not increase the fluctuation of the transmission delay of those data packets that were transmitted successfully. Often the case can be even the opposite, because the dropping of a data packet reduces the traffic jam experienced by other data packets. The purpose in adjusting the degree of filling of a jitter buffer is, however, to facilitate an adequate, high-quality processing for those data packets that were transmitted successfully. In some cases, increases in the degree of filling of a jitter buffer caused by the dropping of data packets can result in an unnecessarily long turn-around delay of digital data in said jitter buffer.

SUMMARY

The invention relates to an arrangement for adjusting the degree of filling of a jitter buffer. To said jitter buffer, there is connected a read-out unit for reading digital data from said jitter buffer. The arrangement according to the invention includes a processing unit, which is arranged:

to compose, as a response to receiving a protocol unit, a time reserve indicator for said protocol unit, said time reserve indicator being essentially the difference of a first order indicator connected to said protocol unit and a second order indicator connected to the operational cycle of the read-out unit, while said first order indicator indicates the position in the timewise reading order of the digital data contained in said protocol unit to be read from said jitter buffer, and said second order indicator indicates the position in the timewise reading order of the digital data to be read from the jitter buffer during said operational cycle, to make a decision whether to increase the degree of filling of the jitter buffer, at least partly on the basis of said time reserve indicator of the protocol unit, and to increase the degree of filling of the jitter buffer as a response to a situation where said decision is positive.

In an embodiment the time reserve indicator of a protocol unit indicates whether said protocol unit was received in good time, in order to ensure that the digital data contained therein is in the jitter buffer when said digital data is in turn to be read out.

The invention also relates to a network element in a data network element. A network element according to the invention comprises:

a reception gate arranged to receive a protocol unit from a data transmission link, a jitter buffer arranged to store digital data contained by said protocol units, a read-out unit arranged to read said digital data from said jitter buffer, and a processing unit that is arranged:

a) to compose, as a response to receiving said protocol unit, a time reserve indicator for said protocol unit, which time reserve indicator is essentially the difference of a first order indicator connected to said protocol unit and a second order indicator connected to the operational cycle of the read-out unit, said first order indicator indicating the position in the timewise reading order of the digital data contained by said protocol unit to be read from said jitter buffer and said second order indicator indicating the position in the timewise reading order of the digital data to be read from the jitter buffer during said operational cycle, b) to make a decision whether to increase the degree of filling of a jitter buffer, at least partly on the basis of said time reserve indicator of the protocol unit, and c) to increase the degree of filling of a jitter buffer as a response to a situation where said decision is positive.

The invention also relates to a method for adjusting the degree of filling of a jitter buffer. To said jitter buffer, there is connected a read-out unit for reading digital data from said jitter buffer. In the method according to the invention:

as a response to receiving a protocol unit, there is composed a time reserve indicator for said protocol unit, said time reserve indicator being essentially the difference of a first order indicator connected to said protocol unit and a second order indicator connected to the operational cycle of the read-out unit, said first order indicator indicating the position in the timewise reading order of the digital data contained by said protocol unit to be read from said jitter buffer, and said second order indicator indicating the position in the timewise reading order of the digital data to be read from the jitter buffer during said operational cycle, there is made a decision whether the degree of filling of the jitter buffer should be increased, at least partly on the basis of said time reserve indicator of the protocol unit, and the degree of filling of the jitter buffer is increased as a response to a situation where said decision is positive.

The invention also relates to a computer program for adjusting the degree of filling of a jitter buffer. To said jitter buffer, there is connected a read-out unit for reading digital data from said jitter buffer. A computer program according to the invention comprises:

programwise means for guiding a programmable processor to compose, as a response to receiving a protocol unit, a time reserve indicator for said protocol unit, which time reserve indicator is essentially the difference of a first order indicator connected to said protocol unit and a second order indicator connected to the operational cycle of the read-out unit, said first order indicator indicating the position in the timewise reading order of the digital data contained by said protocol unit to be read from said jitter buffer, and said second order indicator indicating the position in the timewise reading order of the digital data to be read from the jitter buffer during said operational cycle, programwise means for guiding said programmable processor to make a decision whether to increase the degree of filling of the jitter buffer, at least partly on the basis of said time reserve indicator of the protocol unit, and programwise means for guiding said programmable processor to increase the degree of filling of the jitter buffer as a response to a situation where said decision is positive.

By embodiments of invention, there is achieved an advantage in comparison with the prior art arrangement described above, i.e. that droppings of protocol units do not result in undesirable increasing of the degree of filling of the jitter buffer, because the operations of increasing the degree of filling are carried out on the basis of time reserve indicators composed for received protocol units. In case a protocol unit is dropped, it is not received, and a time reserve indicator is not composed for it.

The various embodiments of the invention are characterized by what is set forth in the dependent claims.

BRIEF DESCRIPTION OF THE DRAWINGS

The embodiments of the invention and their advantages are described below in more detail with reference to a few exemplary embodiments and appended drawings, where.

DETAILED DESCRIPTION OF THE EMBODIMENTS OF THE INVENTION

Figure 1:
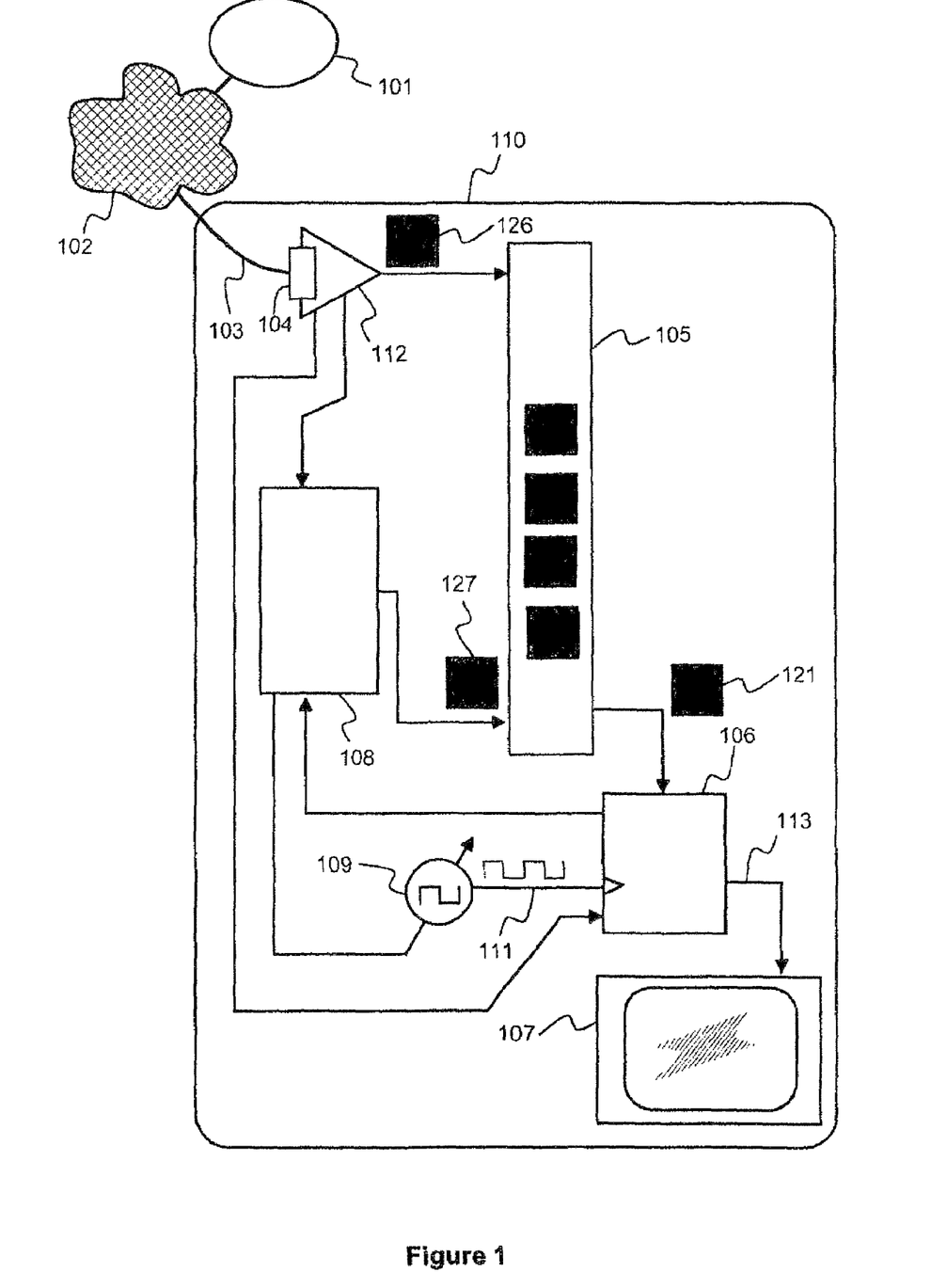
FIG. 1 is a block diagram illustrating an example of a system provided with an arrangement according to an embodiment of the invention for adjusting the degree of filling of a jitter buffer.

FIG. 1 is a block diagram illustrating an example of a data transmission system provided with an arrangement according to an embodiment of the invention for adjusting the degree of filling of a jitter buffer. In a data transmission system, a digital data transmitter 101 transmits protocol units containing digital data through a transmission network 102; said protocol units can be data packets, cells, or frames. At the reception end 110, there is a reception gate 104, which is arranged to receive said protocol units from a data transmission link 103 connected to the data network 102. Data processing means 112 connected to the reception gate are arranged to write the digital data contained by the received protocol units in a jitter buffer 105. The received protocol units can be written in said jitter buffer either completely, or by writing only the payload data contained by the received protocol units. It also is possible to write in the jitter buffer both the payload data of the received protocol unit, and part of the header and/or control data of said protocol unit. To the jitter buffer 105, there is connected a read-out unit 106, which is arranged to read digital data from the jitter buffer at a pace determined by a clock signal 111. The read-out unit 106 is arranged to feed digital data read from the jitter buffer 105 to a terminal device 107, which can be for example a display monitor or a telephone device. The clock signal 111 can be obtained from an external timing source, or it can be generated by an adjustable local oscillator 109.

It is often possible that the data transmission network 102 can alter the timewise order of the protocol units to be transmitted therethrough. In that case the timewise reception order of the protocol units at the reception end 110 is not necessarily the same as the transmission order of said protocol units. Now the protocol units advantageously contain a sequence number, a transmission time stamp indicating the transmission moment or some other data, by means of which the transmission order of said protocol units can be reconstructed at the reception end 110. The read-out unit 106 is advantageously arranged to keep a record on the basis of the information obtained from the data processing means 112, said record indicating for instance a memory address, on the basis of which for example digital data contained by a protocol unit corresponding to a certain sequence number can be found from the jitter buffer memory space. The read-out unit 106 is advantageously arranged to feed to the terminal device 107 digital filler data in a situation where the jitter buffer 105 does not, at the point of time under observation, contain the required digital data. At the point of time under observation, the require digital data may be lacking owing to the dropping of a protocol unit or to a delayed arrival caused by a transmission delay experienced by the protocol unit.

An arrangement for adjusting the degree of filling of the jitter buffer 105 includes a processing unit 108, which is arranged to compose a time reserve indicator for a received protocol unit 126, said time reserve indicator being essentially the difference of a first order indicator connected to the received protocol unit 126 and a second order indicator connected to the operational cycle of the read-out unit 106. The order indicator connected to the protocol unit 126 indicates the position timewise reading order of the digital data contained in the protocol unit 126 position to be read from the jitter buffer 105. The order indicator connected to the operational cycle of the read-out unit 106 indicates the position in said timewise reading order of the digital data to be read from the jitter buffer 105 during said operational cycle. Said operational cycle of the read-out unit is preferably that operational cycle of the read-out unit that is being run at the point of time when the protocol unit 126 is received. The time reserve indicator of the protocol unit 126 indicates whether the protocol unit 126 was received in good time, in order to ensure that the digital data contained therein is in the jitter buffer 105 when said digital data is in turn to be read out. The processing unit 108 is arranged to make a decision whether to increase the degree of filling of the jitter buffer 105, at least partly on the basis of said time reserve indicator, and to increase the degree of filling of the jitter buffer as a response to a situation where said decision is positive.

In an arrangement according to an embodiment of the invention, the order indicator connected to the received protocol unit 126 is the sequence number of said protocol unit 126. The order indicator connected to the operational cycle of the read-out unit 106 is the sequence number of that protocol unit, for the reading of the digital data contained by which said operational cycle is designated. The sequence numbers of the protocol units indicate their timewise transmission order. FIG. 1 illustrates an exemplary situation where the digital data contained by the protocol unit 121 is in turn to be read out. Now said order indicator connected to the operational cycle of the read-out unit 106 is the sequence number of the protocol unit 121.

In an arrangement according to an embodiment of the invention, the order indicator connected to the received protocol unit 126 indicator is the transmission time stamp contained by the protocol unit 126 and indicating the point of transmission. The order indicator connected to the operational cycle of the read-out unit 106 is the transmission time stamp contained by that protocol unit 121, for the reading of the digital data contained by which said operational cycle is designated.

In an arrangement according to an embodiment of the invention, the order indicator connected to the received protocol unit 126 is the transmission time stamp contained by the protocol unit 126 and indicating the point of transmission. The order indicator connected to the operational cycle of the read-out unit 106 is essentially a value extrapolated on the basis of the transmission time stamps of those protocol units, for the reading of the digital data contained by which said operational cycle and the operational cycle preceding said operational cycle are designated.

By means of said extrapolated value, it is possible to take into account the fact that part of the digital data contained by the protocol unit 121 is possible read already at the point of receiving the protocol unit 126. Said part of the digital data that is already read does not represent that share of the digital data that shall be read prior to reading the digital data contained by the protocol unit 126. By means of the extrapolated value, it is possible to more precisely indicate a situation where there is a need to increase the degree of filling of the jitter buffer, than with a process where the order indicator connected to the operational cycle of the read-out unit is a transmission time stamp or a sequence number of a protocol unit.

In an arrangement according to an embodiment of the invention, the processing unit 108 is arranged to increase the degree of filling of the jitter buffer 105 as a response to a situation where the time reserve indicator of the received protocol unit 126 is smaller than a predetermined additive threshold value.

In an arrangement according to an embodiment of the invention, the processing unit 108 is arranged to increase the degree of filling of the jitter buffer 105 as a response to a situation where during a predetermined period, there is received at least a predetermined number of protocol units with a time reserve indicator that is smaller than a predetermined additive threshold value. The length of said period can be for example 1 second, and said predetermined number can be for example 100.

In an arrangement according to an embodiment of the invention, the processing unit 108 is arranged to increase the degree of filling of the jitter buffer 105 as a response to a situation where a predetermined number of protocol units received timewise in succession represent at least a predetermined share of protocol units with a time reserve indicator that is smaller than a predetermined additive threshold value. Said predetermined quantity can be for example 1000 and said predetermined share can be for example 100/1000.

In an arrangement according to an embodiment of the invention, the processing unit 108 is arranged to increase the degree of filling of the jitter buffer 105 by writing digital filler data 127 in the jitter buffer.

In an arrangement according to an embodiment of the invention, the processing unit 108 is arranged to increase the degree of filling of the jitter buffer 105 by reducing the read-out rate of the digital data stored in the jitter buffer. The read-out rate can be reduced by adjusting a local oscillator 109, so that the frequency of the clock signal 111 is reduced, and/or by setting the read-out unit 106 in a mode where the reading of digital data from the jitter buffer 105 is temporarily interrupted (read-out rate=0), and the output data flow 113 from the read-out unit contains digital filler data. Interrupting the read-out of the digital data delays the starting point of that operational cycle of the read-out unit 106 where the digital data contained by the received protocol unit 126 is read.

Large, sudden changes cannot generally be made in the frequency of the clock signal 111. Thus the increasing of the degree of filling of the jitter buffer 105 by reducing the clock signal frequency is generally a fairly slow measure. The degree of filling of the jitter buffer can be increased rapidly by writing filler data in the jitter buffer. The starting point of the write-out turn of the digital data contained by the received protocol unit can be delayed by applying the above described procedure, where the read-out unit 106 is conducted to a mode where the reading of digital data from the jitter buffer is temporarily interrupted, and the output data flow 113 from the read-out unit contains digital filler data. By means of said procedure, it is possible also to make use of protocol units with reception points of time that occur later than the read-out turns of the digital data contained by said protocol units.

In an arrangement according to an embodiment of the invention, the processing unit 108 is arranged to increase the degree of filling of the jitter buffer 105 by both reducing the read-out rate of the digital data stored in the jitter buffer and by writing digital filler data 127 in the jitter buffer Small and/or slow additions in the degree of filling of a jitter buffer are advantageously realized by adjusting the frequency of the clock signal 111, whereas fast and large additions are preferably realized by writing digital filler data in the jitter buffer. Instead of writing digital filler data, it is also possible to apply a procedure where the read-out unit 106 is conducted to a mode where the reading of digital data in the jitter buffer is temporarily interrupted, and the output data flow 113 from the read-out unit contains digital filler data.

In an arrangement according to an embodiment of the invention, the processing unit 108 is arranged to reduce the degree of filling of the jitter buffer 105 as a response to a situation where the time reserve indicator of the received protocol unit 126 is larger than a predetermined reductive threshold value. The degree of filling of the jitter buffer 105 is reduced, in order to prevent an unnecessarily long digital data turn-around delay in the jitter buffer.

In an arrangement according to an embodiment of the invention, the processing unit 108 is arranged to reduce the degree of filling of the jitter buffer 105 as a response to a situation where the time reserve indicator of every protocol unit that is received during a period of a predetermined length is larger than a predetermined reductive threshold value.

In an arrangement according to an embodiment of the invention, the processing unit 108 is arranged to reduce the degree of filling of the jitter buffer 105 as a response to a situation where the time reserve indicator of every protocol unit that belongs to a group with a predetermined size of protocol units received in succession is larger than a predetermined reductive threshold value.

In an arrangement according to an embodiment of the invention, the processing unit 108 is arranged to reduce the degree of filling of the jitter buffer 105 by removing digital data from said jitter buffer.

In an arrangement according to an embodiment of the invention, the processing unit 108 is arranged to reduce the degree of filling of the jitter buffer 105 by increasing the read-out rate of the digital data stored in said jitter buffer. The read-out rate can be increased by adjusting a local oscillator 109, so that the frequency of the clock signal 111 increases.

In an arrangement according to an embodiment of the invention, the processing unit 108 is arranged to reduce the degree of filling of the jitter buffer 105 both by increasing the read-out rate of the digital data stored in said jitter buffer and by removing digital data from said jitter buffer.

In an arrangement according to an embodiment of the invention, the processing unit 108 is arranged to reduce the degree of filling of the jitter buffer 105 by preventing the running of a predetermined operation, said predetermined operation comprising the integration of the digital filler data to the output data flow 113 from the read-out unit 106. It has been possible to command digital filler data to be integrated in the output data flow 113 in a situation where it has been detected that digital data contained by one or several protocol units is not found in the jitter buffer at the read-out point of said digital data. In this situation, the digital filler data is designated to replace the digital data contained by said protocol units in the output data flow 113.

Figure 2:
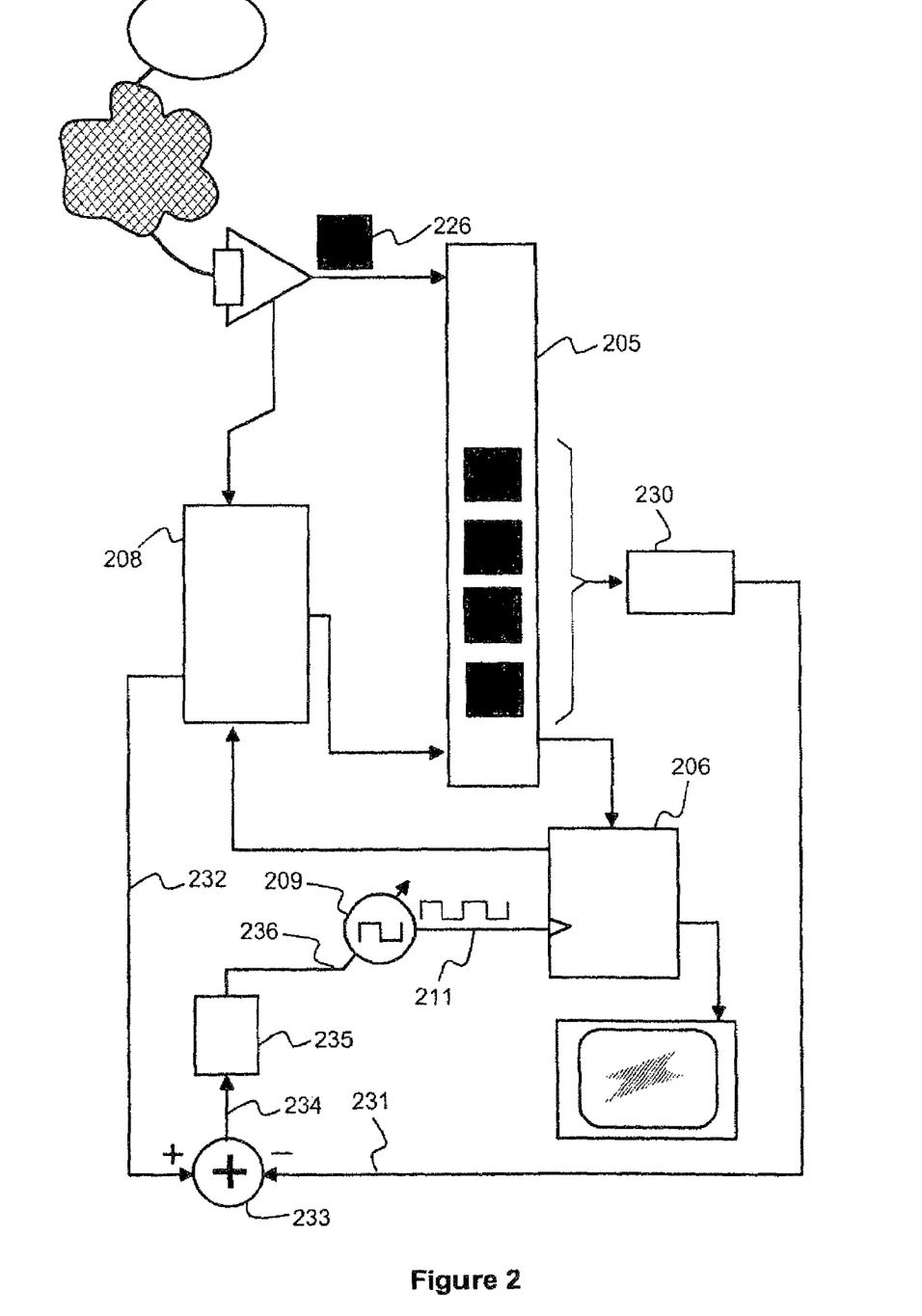
FIG. 2 is a block diagram illustrating an example of a data transmission system provided with an arrangement according to an embodiment of the invention for adjusting the degree of filling of a jitter buffer.

FIG. 2 is a block diagram illustrating an example of a data transmission system provided with an arrangement according to an embodiment of the invention for adjusting the degree of filling of a jitter buffer. The data transmission system includes a low-pass filter 230, which is arranged to compose a low-pass filtered value 231 of the degree of filling of the jitter buffer 205. Calculation means 233 are arranged to compose a difference value 234 between the object value 232 of the degree of filling and said low-pass filtered value. An adjuster 235 is arranged to compose an adjusting value 236 for a local oscillator 209 on the basis of said difference value 234. The local oscillator is arranged generate a clock signal 2111 the frequency of which depends on the adjusting value 236. The read-out unit 206 is arranged to read digital data from the jitter buffer 205 at a rate determined by the clock signal 211.

The arrangement for adjusting the degree of filling of a jitter buffer 205 includes a processing unit 208, which is arranged to compose a time reserve indicator for the received protocol unit 226, said time reserve indicator being essentially the difference of the order indicator connected to the received protocol unit 226 and the order indicator connected to the operational cycle of the read-out unit 206. Said operational cycle of the read-out unit is preferably the operational cycle of the read-out unit that is being run at the point of reception of the protocol unit 226. The processing unit 208 is arranged to make a decision whether to increase the degree of filling of the jitter buffer 205, at least partly on the basis of said time reserve indicator, and to increase the object value 232 of the degree of filling of the jitter buffer as a response to a situation where said decision is positive.

In an arrangement according to an embodiment of the invention, the processing unit 208 is arranged to make a decision whether to reduce the degree of filling of the jitter buffer 205, at least partly on the basis of said time reserve indicator, and to reduce the object value 232 of the degree of filling of the jitter buffer as a response to a situation where the decision related to the reduction is positive.

Figure 3:
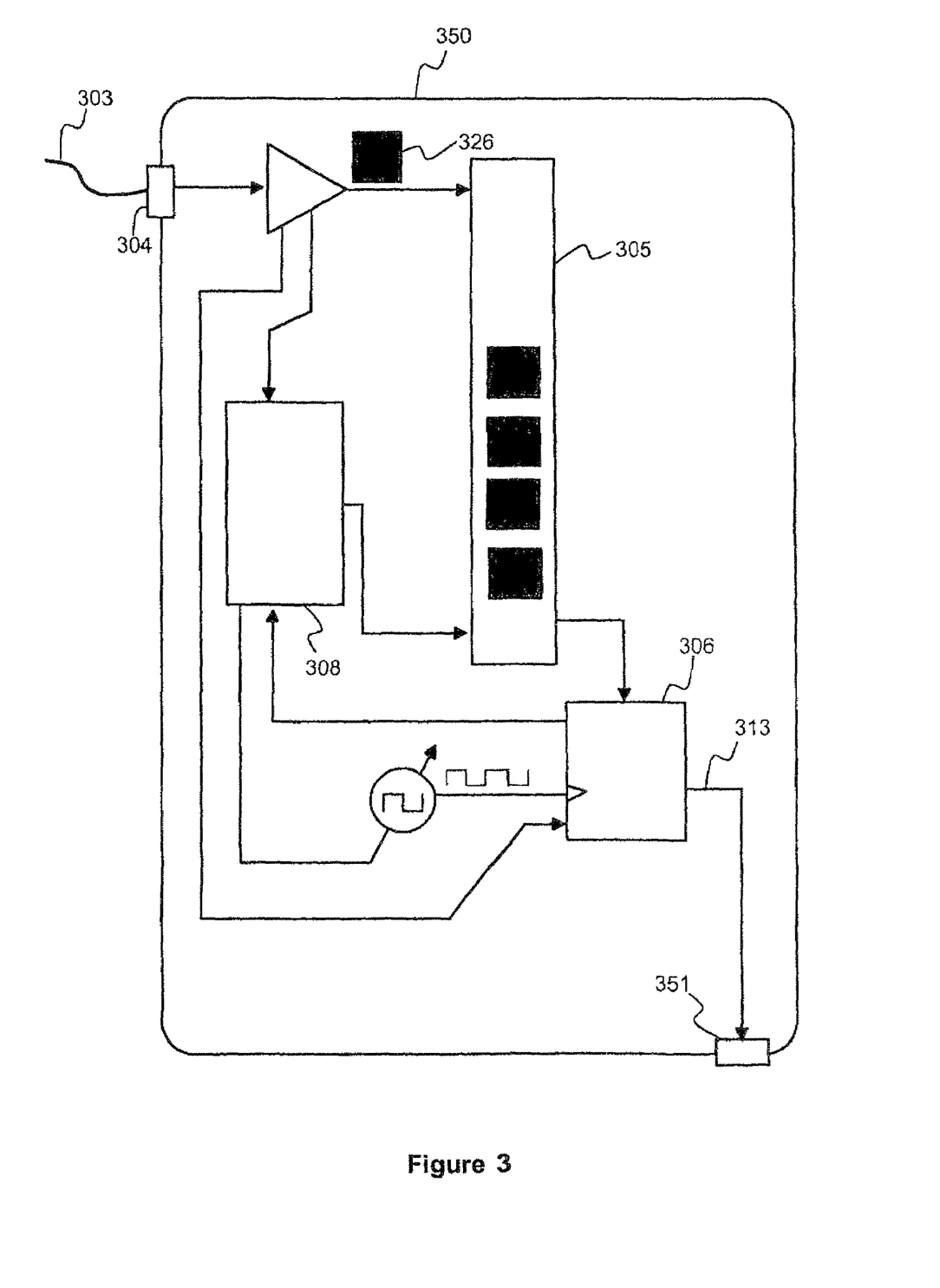
FIG. 3 is a block diagram illustrating a network element in a data network according to an embodiment of the invention.

FIG. 3 is a block diagram illustrating a network element 350 in a data network according to an embodiment of the invention. The network element is provided with a reception gate 304, which is arranged to receive the protocol unit 326 from the data transmission link 303. Said protocol unit can be for example an IP packet (Internet Protocol), an ATM cell (Asynchronous Transfer Mode), an Ethernet frame, an MPLS packet (MultiProtocol Label Switching) or a Frame Relay frame. The network element includes a jitter buffer 305, which is arranged to store digital data contained by said protocol unit. The network element includes a read-out unit 306, which is arranged to read said digital data from the jitter buffer 305. The read-out unit 306 is arranged to feed digital data read from the jitter buffer 305 to the outlet gate 351. The network element contains a processing unit 308, which is arranged to compose the time reserve indicator for the received protocol unit 326, which time reserve indicator is essentially the difference of a first order indicator connected to the received protocol unit 326 and a second order indicator connected to the operational cycle of the read-out unit 306. The order indicator connected to the protocol unit 326 indicates the position in the timewise reading order of the digital data contained in the protocol unit 326 to be read from the jitter buffer 305. The order indicator connected to the operational cycle of the read-out unit 306 indicates the position in the timewise reading order of the digital data to be read from the jitter buffer 305 during said operational cycle. Said operational cycle of the read-out unit is preferably the reception point of the protocol unit 326 during the operational cycle of the read-out unit that is being run. The processing unit 308 is arranged to make a decision whether the degree of filling of the jitter buffer 305 should be increased, at least partly on the basis of said time reserve indicator, and to increase the degree of filling of the jitter buffer as a response to a situation where said decision is positive.

In a network element according to an embodiment of the invention, the processing unit 308 is arranged to make a decision whether to reduce the degree of filling of the jitter buffer 305, at least partly on the basis of said time reserve indicator, and to reduce the degree of filling of the jitter buffer as a response to a situation where the decision related to the reduction is positive.

Figure 4:
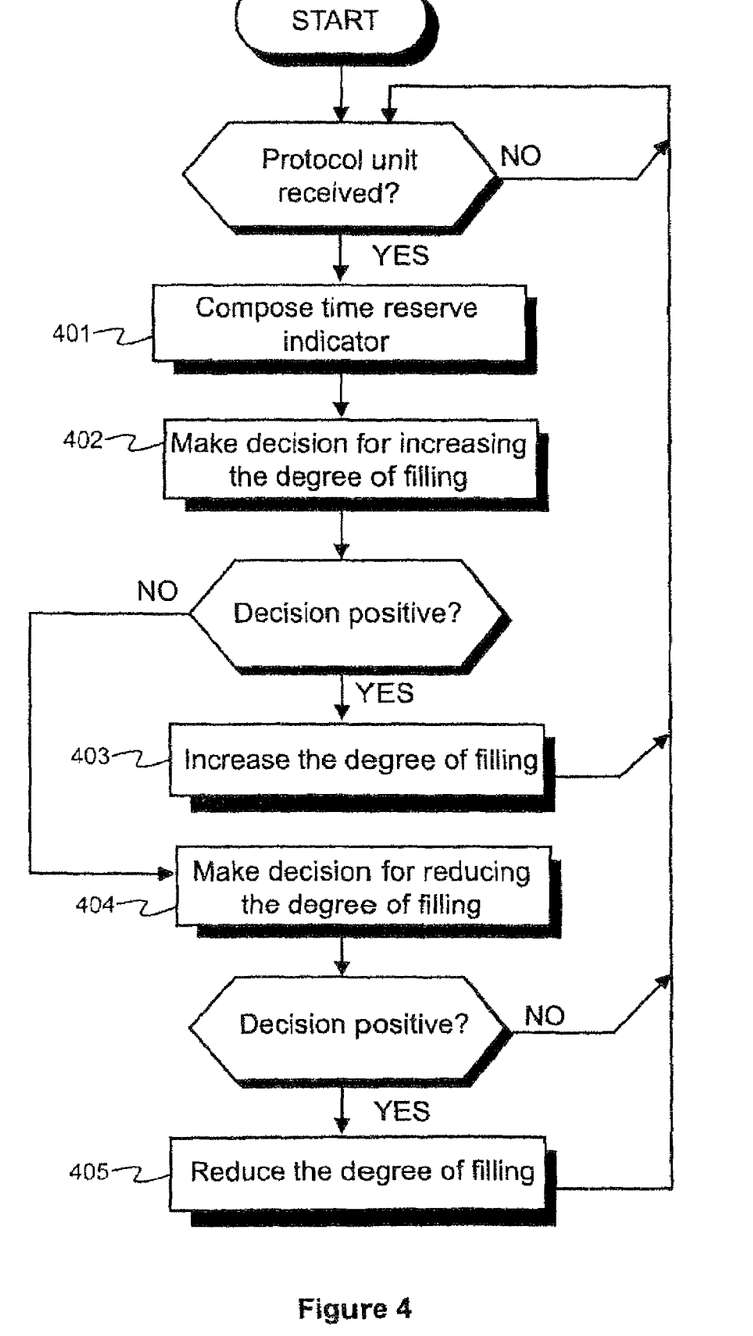
FIG. 4 is a flow diagram illustrating a process according to an embodiment of the invention for adjusting the degree of filling of a jitter buffer.

FIG. 4 is a flow diagram illustrating a process according to an embodiment of the invention for adjusting the degree of filling of a jitter buffer. To said jitter buffer, there is connected a read-out unit for reading digital data from said jitter buffer. As a response to receiving a protocol unit, in step 401 there is composed a time reserve indicator for said protocol unit, which is essentially the difference of a first order indicator connected to said protocol unit and a second order indicator connected to the operational cycle of the read-out unit. The order indicator connected to said protocol unit indicates the position in the timewise reading order of the digital data contained in said protocol unit to be read from said jitter buffer. The order indicator connected to the operational cycle of the read-out unit indicates the position in the timewise reading order of the digital data to be read from said jitter buffer during said operational cycle. Said operational cycle of the read-out unit is preferably the operational cycle of the read-out unit that is being run at the point of reception of said protocol unit. In step 402, there is made a decision whether to increase the degree of filling of the jitter buffer, at least partly on the basis of said time reserve indicator of the protocol unit. In step 403, the degree of filling of the jitter buffer is increased, if the decision made in step 402 is positive.

In a method according to an embodiment of the invention, said first order indicator is the sequence number of said protocol unit, and said second order indicator is the sequence number of that protocol unit, for the reading of the digital data contained by which said operational cycle of the read-out unit is designated.

In a method according to an embodiment of the invention, said first order indicator is a transmission time stamp contained by said protocol unit and indicating the point of transmission, and said second order indicator is the transmission time stamp contained by that protocol unit, for the reading of the digital data contained by which said operational cycle of the read-out unit is designated.

In a method according to an embodiment of the invention, said first order indicator is the transmission time stamp contained by said protocol unit and indicating the point of transmission, and said second order indicator is essentially a value extrapolated on the basis of the transmission time stamps of those protocol units, for the reading of the digital data contained by which said operational cycle of the read-out unit and the operational cycle preceding said operational cycle are designated.

In a method according to an embodiment of the invention, the degree of filling of a jitter buffer is increased (402, 403) as a response to a situation where the time reserve indicator of said protocol unit is smaller than a predetermined additive threshold value.

In a method according to an embodiment of the invention, the degree of filling of a jitter buffer is increased (402, 403) as a response to a situation where during a period of a predetermined length, there is received at least a predetermined number of protocol units with a time reserve indicator that is smaller than a predetermined additive threshold value.

In a method according to an embodiment of the invention, the degree of filling of a jitter buffer is increased (402, 403) as a response to a situation where a predetermined number of protocol units received timewise in succession contains at a least predetermined share of protocol units with a time reserve indicator that is smaller than a predetermined additive threshold value.

In a method according to an embodiment of the invention, the degree of filling of a jitter buffer is reduced (404, 405) as a response to a situation where the time reserve indicator of said protocol unit is larger than a predetermined reductive threshold value.

In a method according to an embodiment of the invention, the degree of filling of a jitter buffer is reduced (404, 405) as a response to a situation where the time reserve indicator of every protocol unit that is received during a predetermined period is larger than a predetermined reductive threshold value.

In a method according to an embodiment of the invention, the degree of filling of a jitter buffer is reduced (404, 405) as a response to a situation where the time reserve indicator of every protocol unit belonging to a group of a predetermined size of protocol units received in succession is larger than a predetermined reductive threshold value.

Said predetermined reductive threshold value is advantageously larger than said predetermined additive threshold value.

In a method according to an embodiment of the invention, the degree of filling of a jitter buffer is increased (403) by writing digital filler data in said jitter buffer.

In a method according to an embodiment of the invention, the degree of filling of a jitter buffer is increased (403) by reducing the read-out rate of the digital data stored in said jitter buffer.

In a method according to an embodiment of the invention, the degree of filling of a jitter buffer is increased (403) both by reducing the read-out rate of the digital data stored in said jitter buffer and by writing digital filler data in said jitter buffer.

In a method according to an embodiment of the invention, the degree of filling of a jitter buffer is reduced (405) by removing digital data from said jitter buffer.

In a method according to an embodiment of the invention, the degree of filling of a jitter buffer is reduced (405) by increasing the read-out rate of the digital data stored in said jitter buffer.

In a method according to an embodiment of the invention, the degree of filling of a jitter buffer is reduced (405) both by increasing the read-out rate of the digital data stored in said jitter buffer and by removing digital data from said jitter buffer.

In a method according to an embodiment of the invention, the degree of filling of a jitter buffer is reduced (405) by preventing the running of a predetermined operation, said predetermined operation comprising the integration of digital filler data to the output data flow from said read-out unit.

A computer program according to an embodiment of the invention for adjusting the degree of filling of a jitter buffer, said jitter buffer being provided with a read-out unit for reading digital data from said jitter buffer, comprises the following programwise means:

programwise means for guiding a programmable processor to compose, as a response to receiving a protocol unit, a time reserve indicator for said protocol unit, which time reserve indicator is essentially the difference of a first order indicator connected to said protocol unit and a second order indicator connected to the operational cycle of the read-out unit, where said first order indicator indicates the position in the timewise reading order of the digital data contained in said protocol unit to be read from the jitter buffer, and said second order indicator indicates the position in the timewise reading order of the digital data to be read from the jitter buffer during said operational cycle, programwise means for guiding said programmable processor to make a decision whether to increase the degree of filling of the jitter buffer, at least partly on the basis of said time reserve indicator of the protocol unit, and programwise means for guiding said programmable processor to increase the degree of filling of the jitter buffer as a response to a situation where said decision is positive.

Said programwise means can be for example sub-programs or functions. For example the protocol unit 108 illustrated in FIG. 1 can be said programmable processor.

A computer program according to an embodiment of the invention is recorded in a recording means that can be read by the programmable processor, for instance in an optical disk (CD disk, Compact Disk).

As is apparent for a man skilled in the art, the invention and its embodiments are not restricted to the above described exemplary embodiments, but the invention and its various embodiments can be modified within the scope of the independent claim. Expressions describing the existence of the characterizing features included in the claims, for example "the arrangement comprises a processing unit", are open so that the enlisting of the characterizing features does not exclude the existence of other such characterizing features that are not enlisted in the independent or dependent claims.

The invention claimed is:

1. An arrangement for adjusting a degree of filling of a jitter buffer, to which jitter buffer there is connected a read-out unit for reading digital data from said jitter buffer, wherein the arrangement includes a processing unit, which is arranged:

to compose, as a response to receiving a protocol unit, a time reserve indicator for the protocol unit, the time reserve indicator being essentially the difference of a first order indicator connected to the protocol unit and a second order indicator connected to an operational cycle of the read-out unit, the first order indicator expressing a position of digital data contained by the protocol unit in a timewise reading order of digital data to be read from the jitter buffer, and the second order indicator expressing a position of digital data that is being read from the jitter buffer during the operational cycle in the timewise reading order, to make a decision for increasing the degree of filling of the jitter buffer at least partly on a basis of the time reserve indicator of the protocol unit, and to increase the degree of filling of the jitter buffer as a response to a situation where the decision is positive, wherein the decision is positive as a response to one of the following situations: (i) a situation where during a predetermined period of time, there is received at least a predetermined quantity of protocol units whose time reserve indicator is smaller than a predetermined additive threshold value, or (ii) a situation where in the course of a predetermined number of protocol units received in succession, there is contained at least a predetermined share of protocol units having a time reserve indicator that is smaller than a predetermined additive threshold value.

2. The arrangement according to claim 1, wherein said first order indicator is the sequence number of said protocol unit, and said second order indicator is the sequence number of that protocol unit, for the reading of the digital data contained by which said operational cycle of the read-out unit is designated.

3. The arrangement according to claim 1, wherein said first order indicator is the transmission time stamp contained by said protocol unit and indicating the point of transmission, and said second order indicator is the time stamp of that protocol unit, for the reading of the digital data contained by which said operational cycle of the read-out unit is designated.

4. The arrangement according to claim 1, wherein said first order indicator is the transmission time stamp contained by said protocol unit and indicating the point of transmission, and said second order indicator is essentially a value extrapolated on the basis of the transmission time stamps of preceding protocol units, for the reading of the digital data contained by which said operational cycle of the read-out unit and the operational cycle preceding said operational cycle is designated.

5. The arrangement according to claim 1, wherein said processing unit is arranged to increase the degree of filling of a jitter buffer as a response to a situation where the time reserve indicator of said protocol unit is smaller than a predetermined additive threshold value.

6. The arrangement according to claim 1, wherein said processing unit is arranged to increase the degree of filling of a jitter buffer by writing digital filler data in said jitter buffer.

7. The arrangement according to claim 1, wherein said processing unit is arranged to increase the degree of filling of a jitter buffer by reducing the read-out rate of the digital data stored in said jitter buffer.

8. The arrangement according to claim 1, wherein said processing unit is arranged to increase the degree of filling of a jitter buffer by reducing the read-out rate of the digital data stored in said jitter buffer, and by writing digital filler data in said jitter buffer.

9. The arrangement according to claim 1, wherein said processing unit is arranged to reduce the degree of filling of a jitter buffer as a response to a situation where the time reserve indicator of said protocol unit is larger than a predetermined reductive threshold value.

10. The arrangement according to claim 9, wherein said processing unit is arranged to reduce the degree of filling of a jitter buffer by removing digital data from said jitter buffer.

11. The arrangement according to claim 9, wherein said processing unit is arranged to reduce the degree of filling of a jitter buffer by increasing the read-out rate of the digital data stored in said jitter buffer.

12. The arrangement according to claim 9, wherein said processing unit is arranged to reduce the degree of filling of a jitter buffer by increasing the read-out rate of the digital data stored in said jitter buffer, and by removing digital data from said jitter buffer.

13. The arrangement according to claim 9, wherein said processing unit is arranged to reduce the degree of filling of a jitter buffer by preventing the running of a predetermined operation that comprises the integration of digital filler data to the output data flow of said read-out unit.

14. A network element comprising:

a reception gate arranged to receive a protocol unit from a data transmission link, a jitter buffer arranged to store digital data contained by the protocol unit, and a read-out unit arranged to read the digital data from the jitter buffer, wherein the network element also comprises a processing unit (308) that is arranged:

to compose, as a response to receiving the protocol unit, a time reserve indicator for the protocol unit, which time reserve indicator is essentially the difference of a first order indicator connected to the protocol unit and a second order indicator connected to an operational cycle of the read-out unit, the first order indicator expressing a position of digital data contained by the protocol unit in a timewise reading order of digital data to be read from the jitter buffer, and the second order indicator expressing a position of digital data that is being read from the jitter buffer during the operational cycle in the timewise reading order, to make a decision whether to increase the degree of filling of the jitter buffer, at least partly on a basis of the time reserve indicator of the protocol unit, and to increase the degree of filling of the jitter buffer as a response to a situation where the decision is positive, wherein the decision is positive as a response to one of the following situations: (i) a situation where during a predetermined period of time, there is received at least a predetermined quantity of protocol units whose time reserve indicator is smaller than a predetermined additive threshold value, or (ii) a situation where in the course of a predetermined number of protocol units received in succession, there is contained at least a predetermined share of protocol units having a time reserve indicator that is smaller than a predetermined additive threshold value.

15. The network element according to claim 14, wherein said processing unit is arranged to make a decision whether to reduce the degree of filling of a jitter buffer, at least partly on the basis of the time reserve indicator of the protocol unit, and to reduce the degree of filling of the jitter buffer as a response to a situation where the decision whether to reduce is positive.

16. The network element according to claim 14, wherein said protocol unit is one of the following: IP packet (Internet Protocol), ATM cell (Asynchronous Transfer Mode), Ethernet frame, MPLS packet (MultiProtocol Label Switching) or Frame Relay frame.

17. A method for adjusting a degree of filling of a jitter buffer, to which jitter buffer there is connected a read-out unit for reading digital data from the jitter buffer, comprising:

as a response to receiving a protocol unit, there is composed a time reserve indicator for the protocol unit, which time reserve indicator is essentially a difference of a first order indicator connected to the protocol unit and a second order indicator connected to an operational cycle of the read-out unit, the first order indicator expressing a position of digital data contained by the protocol unit in a timewise reading order of digital data to be read from the jitter buffer, and the second order indicator expressing a position of digital data that is being read from the jitter buffer during the operational cycle in the timewise reading order, there is made a decision whether to increase the degree of filling of the jitter buffer, at least partly on a basis of the time reserve indicator of the protocol unit, and the degree of filling of the jitter buffer is increased as a response to a situation where the decision is positive, wherein the decision is positive as a response to one of the following situations: (i) a situation where during a predetermined period of time, there is received at least a predetermined quantity of protocol units whose time reserve indicator is smaller than a predetermined additive threshold value, or (ii) a situation where in the course of a predetermined number of protocol units received in succession, there is contained at least a predetermined share of protocol units having a time reserve indicator that is smaller than a predetermined additive threshold value.

18. The method according to claim 17, wherein said first order indicator is the sequence number of said protocol unit and said second order indicator is the sequence number of that protocol unit, for the reading of the digital data contained by which said operational cycle of the read-out unit is designated.

19. The method according to claim 17, wherein said first order indicator is the transmission time stamp contained by said protocol unit and indicating the point of transmission, and said second order indicator is the transmission time stamp of that protocol unit, for the reading of the digital data contained by which said operational cycle of the read-out unit is designated.

20. The method according to claim 17, wherein said first order indicator is the transmission time stamp contained by said protocol unit and indicating the point of transmission, and said second order indicator is essentially a value extrapolated on the basis of the transmission time stamps of preceding protocol units, for the reading of the digital data contained by which said operational cycle of the read-out unit, and the operational cycle preceding said operational cycle, is designated.

21. The method according to claim 17, wherein the degree of filling of a jitter buffer is increased as a response to a situation where the time reserve indicator of said protocol unit is smaller than a predetermined additive threshold value.

22. The method according to claim 17, wherein the degree of filling of a jitter buffer is increased by writing digital filler data in said jitter buffer.

23. The method according to claim 17, wherein the degree of filling of a jitter buffer is increased by reducing the read-out rate of the digital data stored in said jitter buffer.

24. The method according to claim 17, wherein the degree of filling of a jitter buffer is increased by reducing the read-out rate of the digital data stored in said jitter buffer, and by writing digital filler data in said jitter buffer.

25. The method according to claim 17, wherein the degree of filling of a jitter buffer is reduced as a response to a situation where the time reserve indicator of said protocol unit is larger than a predetermined reductive threshold value.

26. The method according to claim 25, wherein the degree of filling of a jitter buffer is reduced by removing digital data from said jitter buffer.

27. The method according to claim 25, wherein the degree of filling of a jitter buffer is reduced by increasing the read-out rate of the digital data stored in said jitter buffer.

28. The method according to claim 25, wherein the degree of filling of a jitter buffer is reduced by increasing the read-out rate of the digital data stored in said jitter buffer, and by removing digital data from said jitter buffer.

29. The method according to claim 25, wherein the degree of filling of a jitter buffer is reduced by preventing the running of a predetermined operation, said predetermined operation comprising the integration of digital filler data to the output data flow of said read-out unit.

30. A non-transitory computer readable medium encoded with a computer program for adjusting a degree of filling of a jitter buffer, to which jitter buffer there is connected a read-out unit for reading digital data from the jitter buffer, the computer program comprising:

a piece of a computer program for guiding a programmable processor to compose, as a response to receiving a protocol unit, a time reserve indicator for the protocol unit, which time reserve indicator is essentially a difference of a first order indicator connected to the protocol unit and a second order indicator connected to an operational cycle of the read-out unit, the first order indicator expressing a position of digital data contained by the protocol unit in a timewise reading order of digital data to be read from the jitter buffer, and the second order indicator expressing a position of digital data that is being read from the jitter buffer during the operational cycle in the timewise reading order, a piece of a computer program for guiding the programmable processor to make a decision whether to increase the degree of filling of the jitter buffer, at least partly on a basis of the time reserve indicator of the protocol unit, and a piece of a computer program for guiding the programmable processor to increase the degree of filling of the jitter buffer as a response to a situation where the decision is positive, wherein the decision is positive as a response to one of the following situations: (i) a situation where during a predetermined period of time, there is received at least a predetermined quantity of protocol units whose time reserve indicator is smaller than a predetermined additive threshold value, or (ii) a situation where in the course of a predetermined number of protocol units received in succession, there is contained at least a predetermined share of protocol units having a time reserve indicator that is smaller than a predetermined additive threshold value.

31. An arrangement for adjusting a degree of filling of a jitter buffer, to which jitter buffer there is connected a read-out unit for reading digital data from said jitter buffer, wherein the arrangement includes a processing unit, which is arranged:

to compose, as a response to receiving a protocol unit, a time reserve indicator for the protocol unit, the time reserve indicator being essentially the difference of a first order indicator connected to the protocol unit and a second order indicator connected to an operational cycle of the read-out unit, the first order indicator expressing a position of digital data contained by the protocol unit in a timewise reading order of digital data to be read from the jitter buffer, and the second order indicator expressing a position of digital data that is being read from the jitter buffer during the operational cycle in the timewise reading order, to make a decision for increasing the degree of filling of the jitter buffer at least partly on a basis of the time reserve indicator of the protocol unit, to increase the degree of filling of the jitter buffer as a response to a situation where the decision is positive, and to reduce the degree of filling of a jitter buffer as a response to one of the following situations: (i) a situation where the time reserve indicator of every protocol unit received during a period with a predetermined length is larger than a predetermined reductive threshold value, or (ii) a situation where the time reserve indicator of every protocol unit belonging to a group of successively received protocol units with a predetermined size is larger than a predetermined reductive threshold value.

32. A network element comprising:

a reception gate arranged to receive a protocol unit from a data transmission link, a jitter buffer arranged to store digital data contained by the protocol unit, and a read-out unit arranged to read the digital data from the jitter buffer, wherein the network element also comprises a processing unit that is arranged:

to compose, as a response to receiving the protocol unit, a time reserve indicator for the protocol unit, which time reserve indicator is essentially the difference of a first order indicator connected to the protocol unit and a second order indicator connected to an operational cycle of the read-out unit, the first order indicator expressing a position of digital data contained by the protocol unit in a timewise reading order of digital data to be read from the jitter buffer, and the second order indicator expressing a position of digital data that is being read from the jitter buffer during the operational cycle in the timewise reading order, to make a decision whether to increase the degree of filling of the jitter buffer, at least partly on a basis of the time reserve indicator of the protocol unit, to increase the degree of filling of the jitter buffer as a response to a situation where the decision is positive, and to reduce the degree of filling of a jitter buffer as a response to one of the following situations: (i) a situation where the time reserve indicator of every protocol unit received during a period with a predetermined length is larger than a predetermined reductive threshold value, or (ii) a situation where the time reserve indicator of every protocol unit belonging to a group of successively received protocol units with a predetermined size is larger than a predetermined reductive threshold value.

33. A method for adjusting a degree of filling of a jitter buffer, to which jitter buffer there is connected a read-out unit for reading digital data from the jitter buffer, comprising:

as a response to receiving a protocol unit, there is composed a time reserve indicator for the protocol unit, which time reserve indicator is essentially a difference of a first order indicator connected to the protocol unit and a second order indicator connected to an operational cycle of the read-out unit, the first order indicator expressing a position of digital data contained by the protocol unit in a timewise reading order of digital data to be read from the jitter buffer, and the second order indicator expressing a position of digital data that is being read from the jitter buffer during the operational cycle in the timewise reading order, there is made a decision whether to increase the degree of filling of the jitter buffer, at least partly on a basis of the time reserve indicator of the protocol unit, the degree of filling of the jitter buffer is increased as a response to a situation where the decision is positive, the degree of filling of a jitter buffer is reduced as a response to one of the following situations: (i) a situation where the time reserve indicator of every protocol unit received during a period with a predetermined length is larger than a predetermined reductive threshold value, or (ii) a situation where the time reserve indicator of every protocol unit belonging to a group of successively received protocol units with a predetermined size is larger than a predetermined reductive threshold value.

34. A non-transitory computer readable medium encoded with a computer program for adjusting a degree of filling of a jitter buffer, to which jitter buffer there is connected a read-out unit for reading digital data from the jitter buffer, the computer program comprising:

a piece of a computer program for guiding a programmable processor to compose, as a response to receiving a protocol unit, a time reserve indicator for the protocol unit, which time reserve indicator is essentially a difference of a first order indicator connected to the protocol unit and a second order indicator connected to an operational cycle of the read-out unit, the first order indicator expressing a position of digital data contained by the protocol unit in a timewise reading order of digital data to be read from the jitter buffer, and the second order indicator expressing a position of digital data that is being read from the jitter buffer during the operational cycle in the timewise reading order, a piece of a computer program for guiding the programmable processor to make a decision whether to increase the degree of filling of the jitter buffer, at least partly on a basis of the time reserve indicator of the protocol unit, a piece of a computer program for guiding the programmable processor to increase the degree of filling of the jitter buffer as a response to a situation where the decision is positive, and a piece of a computer program for guiding the programmable processor to reduce the degree of filling of a jitter buffer as a response to one of the following situations: (i) a situation where the time reserve indicator of every protocol unit received during a period with a predetermined length is larger than a predetermined reductive threshold value, or (ii) a situation where the time reserve indicator of every protocol unit belonging to a group of successively received protocol units with a predetermined size is larger than a predetermined reductive threshold value.

* * * * *